US008779699B2

(12) United States Patent
Tsuchiya et al.

(10) Patent No.: US 8,779,699 B2
(45) Date of Patent: Jul. 15, 2014

(54) SERVO DEVICE AND REMOTE CONTROL DEVICE HAVING THE SAME

(75) Inventors: Hiroyuki Tsuchiya, Mobara (JP); Shinya Fuji, Ora-gun (JP)

(73) Assignees: Futaba Corporation (JP); Semiconductor Components Industries, LLC, Phoenix, AZ (US)

( * ) Notice: Subject to any disclaimer, the term of this patent is extended or adjusted under 35 U.S.C. 154(b) by 168 days.

(21) Appl. No.: 13/484,748

(22) Filed: May 31, 2012

(65) Prior Publication Data

US 2012/0319540 A1 Dec. 20, 2012

(30) Foreign Application Priority Data

Jun. 14, 2011 (JP) ................................ 2011-132359

(51) Int. Cl.

*H02K 7/14* (2006.01)
*E05B 65/12* (2006.01)
*H04Q 9/00* (2006.01)

(52) U.S. Cl.

USPC ................. 318/4; 318/16; 318/560; 318/561; 700/170; 700/193

(58) Field of Classification Search

USPC ................. 318/4, 16, 561, 560; 700/170, 193
See application file for complete search history.

(56) References Cited

U.S. PATENT DOCUMENTS

| | | | | |
|---|---|---|---|---|
| 6,608,459 | B2 * | 8/2003 | Kasagami et al. ............ | 318/560 |
| 2002/0177920 | A1 * | 11/2002 | Kasagami et al. ............ | 700/170 |

FOREIGN PATENT DOCUMENTS

| | | | |
|---|---|---|---|
| JP | 06-312065 | A | 11/1994 |
| JP | 10-295950 | A | 11/1998 |

* cited by examiner

*Primary Examiner* — Paul Ip
(74) *Attorney, Agent, or Firm* — Quarles & Brady LLP

(57) ABSTRACT

A servo device 30 includes: a control portion 31 for driving and controlling a drive mechanism 32 by receiving a control signal from a transmitter 10, and by transforming the control signal into a drive signal corresponding to characteristic data previously stored in a memory portion 35. The control portion 31 includes: a signal processing portion 33 for discriminating whether the control signal is a maneuver signal or a characteristic data signal; and the memory portion for updating and storing the characteristic data based on the received characteristic data signal when the control signal is discriminated as the characteristic data signal.

7 Claims, 4 Drawing Sheets

SERVO DEVICE AND REMOTE CONTROL DEVICE HAVING THE SAME

CROSS REFERENCE TO RELATED APPLICATIONS

This application is on the basis of Japanese Patent Application No. 2011-132359, the contents of which are hereby incorporated by reference.

BACKGROUND OF THE INVENTION

1. Field of the Invention

The present invention relates to a servo device mounted on an operational object remote-controlled wirelessly such as a model helicopter, a model airplane, a model car, a model ship, an unmanned industrial machine, or the like, and a remote control device having the servo device.

2. Description of the Related Art

The servo device correctly drives an operational region corresponding to an input signal, and is mounted on an operational object (including various models and industrial machines) in the remote control device for remote-controlling the operational object through a wireless communication with such as radio wave. Further, the servo device is used as a drive mechanism in which the operational regions (for example, a rudder, an elevator, an engine throttle, an aileron of a model airplane) of the operational object are correctly driven corresponding to the operational amount at a transmitter side.

Incidentally, a user having the remote control device changes response characteristics of a control signal with respect to the operational amount of the transmitter by methods (1), (2) described below for accepting usage environment (weather and a road surface condition) and for attaining a desired operational feeling.

(1) A method for changing characteristics such as a maximum current value flowing in a motor controller of a motor mounted on the operational object using an unused channel of the transmitter operating the operational object as disclosed in Patent Documents 1 or 2 described below.

(2) A method for changing characteristics by setting a desired current value based on an operation from an external device such as a PC (Personal Computer) after downloading software for changing characteristic to the PC.

[Patent Document 1] JP, A, H06-312065

[Patent Document 2] JP, A, H10-295950

However, the above method (1) is under assumption that there is the unused channel in the transmitter. If there is no unused channel in the user's transmitter, the response characteristics cannot be changed.

Therefore, there is a problem that the user allowed to use this method is limited.

Further, according to the above method (2), the PC as an external device and the servo device are connected to each other with a wire, and the parameters set on a PC screen are reflected on the servo device. Therefore, each time setting the parameters, the PC should be connected to the servo device. The PC should be carried to a place where the operational object is used. Therefore, there is a problem that the setting cannot be changed easily. Further, there is a fear that a user who is unfamiliar to the PC operation may not set the parameters in this way.

Further, the steering responsibility in the radio control operation is changed depending on usage environment. Further, maneuvering feeling is varied depending on an individual user. Therefore, for example, in a case that due to worsening weather during competition, the response characteristics should be rapidly changed, it is difficult to change the setting.

Accordingly, in view of the above problems, an object of the present invention is to provide a servo device of which various setting are set easily to improve usability, and to provide a remote control device having the servo device.

SUMMARY OF THE INVENTION

According to the present invention, there is provided a servo device including: a control portion for driving and controlling a drive mechanism by receiving a control signal from a transmitter, and by transforming the control signal into a drive signal corresponding to characteristic data previously stored in a memory portion, wherein the control portion includes a signal processing portion for discriminating whether the control signal from the transmitter is a maneuver signal for driving and controlling the drive mechanism or a characteristic data signal for changing response characteristic of the characteristic data, and wherein the memory portion updates and stores the characteristic data based on the received characteristic data signal when the control signal is discriminated as the characteristic data signal.

Preferably, the characteristic data signal is serial data including data of setting the response characteristic, and the maneuver signal is a PWM signal.

Preferably, the signal processing portion holds a threshold value for comparing a pulse width as signal discrimination data to discriminate whether a pulse width of the control signal is less than a specific length or not, and discriminates whether the control signal is the maneuver signal or the characteristic data signal by comparing the control signal from the transmitter with the signal discrimination data.

Preferably, the memory portion includes: a maneuver signal memory means for storing the maneuver signal; and a characteristic data memory means in which memory areas for individually storing the characteristic data are divided corresponding to the number of the characteristic data, and in which a memory address for storing the characteristic data in the memory areas is set for every memory area. Further, the signal processing portion includes: a memory address generation means for generating a memory address to store the maneuver signal in the maneuver signal memory means, and a memory address to store the characteristic data in the corresponding memory area of the characteristic data memory means. The signal processing portion compares the pulse width of the inputted control signal with the signal discrimination data. If the control signal is the maneuver signal, the maneuver signal is stored in the maneuver signal memory means in accordance with the memory address generated in the memory address generation means. If the control signal is the characteristic data signal, the characteristic data signal is stored in the corresponding memory area of the characteristic data memory means in accordance with the memory address.

According to another aspect of the present invention, there is provided a remote control device including:

a transmitter for transmitting a control signal which is any one of a maneuver signal corresponding to an operational amount of an operational portion corresponding to each channel corresponding to every movable region of an operational object or a characteristic data signal for changing characteristic data as response characteristic;

a receiver for receiving the control signal from the transmitter; and a servo device for discriminating whether the control signal received via the receiver is the maneuver signal or the characteristic data signal and for updating and storing the characteristic data stored in a memory portion based on the received characteristic data signal when the control signal is discriminated as the characteristic data signal.

Advantageous Effects of Invention

According to the servo device of the present invention, the characteristic data as the response characteristic is set easily by only outputting the control signal generated by the transmitter via the receiver to the servo device without using the unused channel of the transmitter and without using the external device such as the PC.

Further, using only one transmitter, it is discriminated whether the control signal is the maneuver signal or the characteristic data signal with a pulse width of the inputted control signal, and the maneuvering of the operational object or updating and storing the characteristic data is performed depending on a type of the control signal. Therefore, the setting of the response characteristic can be easily changed.

These and other objects, features, and advantages of the present invention will become more apparent upon reading of the following detailed description along with the accompanied drawings.

DESCRIPTION OF EMBODIMENTS

Hereinafter, an embodiment according to the present invention will be explained in detail with reference to attached figures.

(Device Configuration)

First, a configurational requirement of a remote control device having a servo device according to the present invention will be explained with reference to FIGS. 1 to 3.

Figure 1:
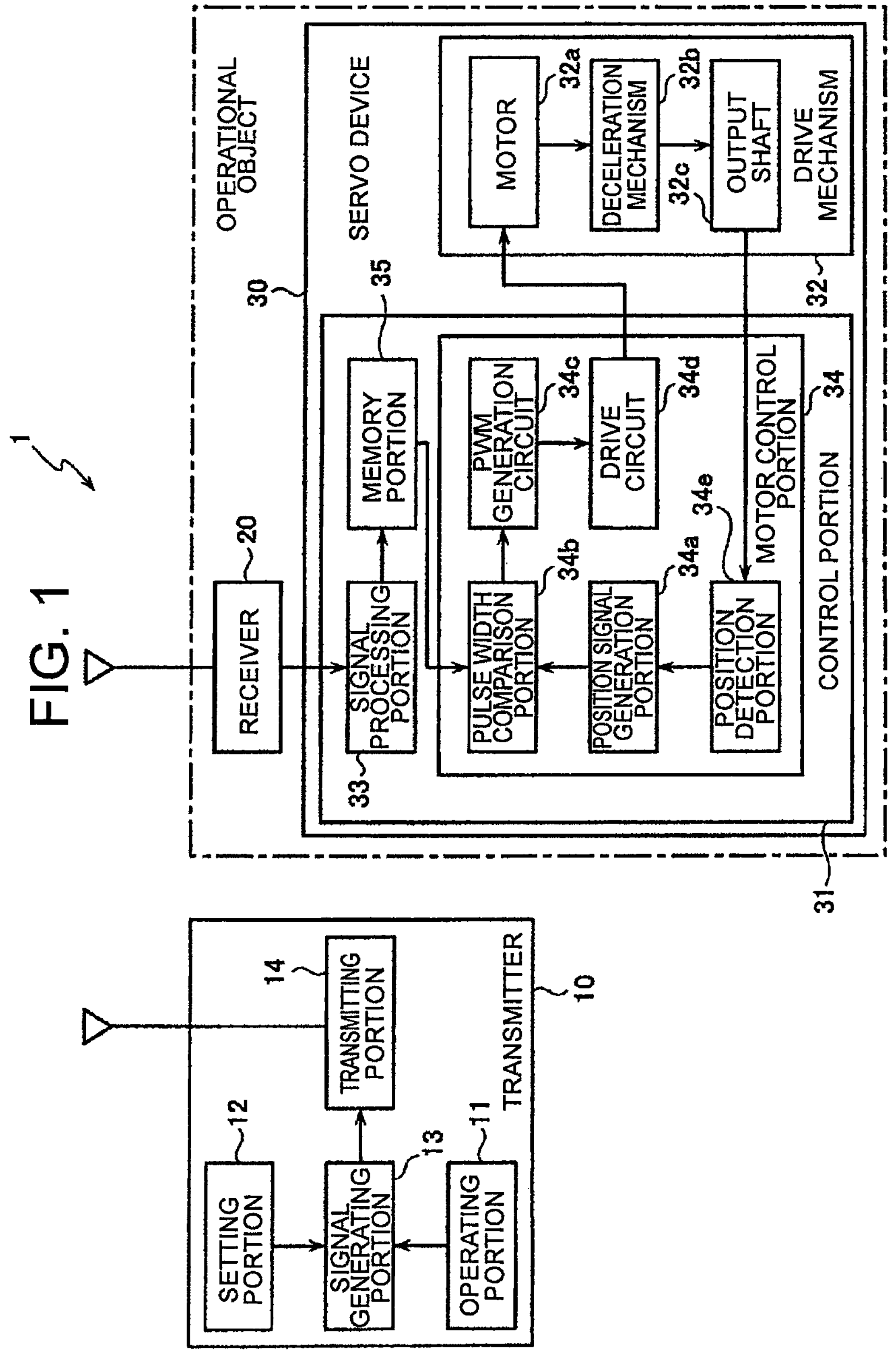
FIG. 1 is a functional block diagram showing a schematic configuration of a remote control device according to the present invention.
Figure 2:
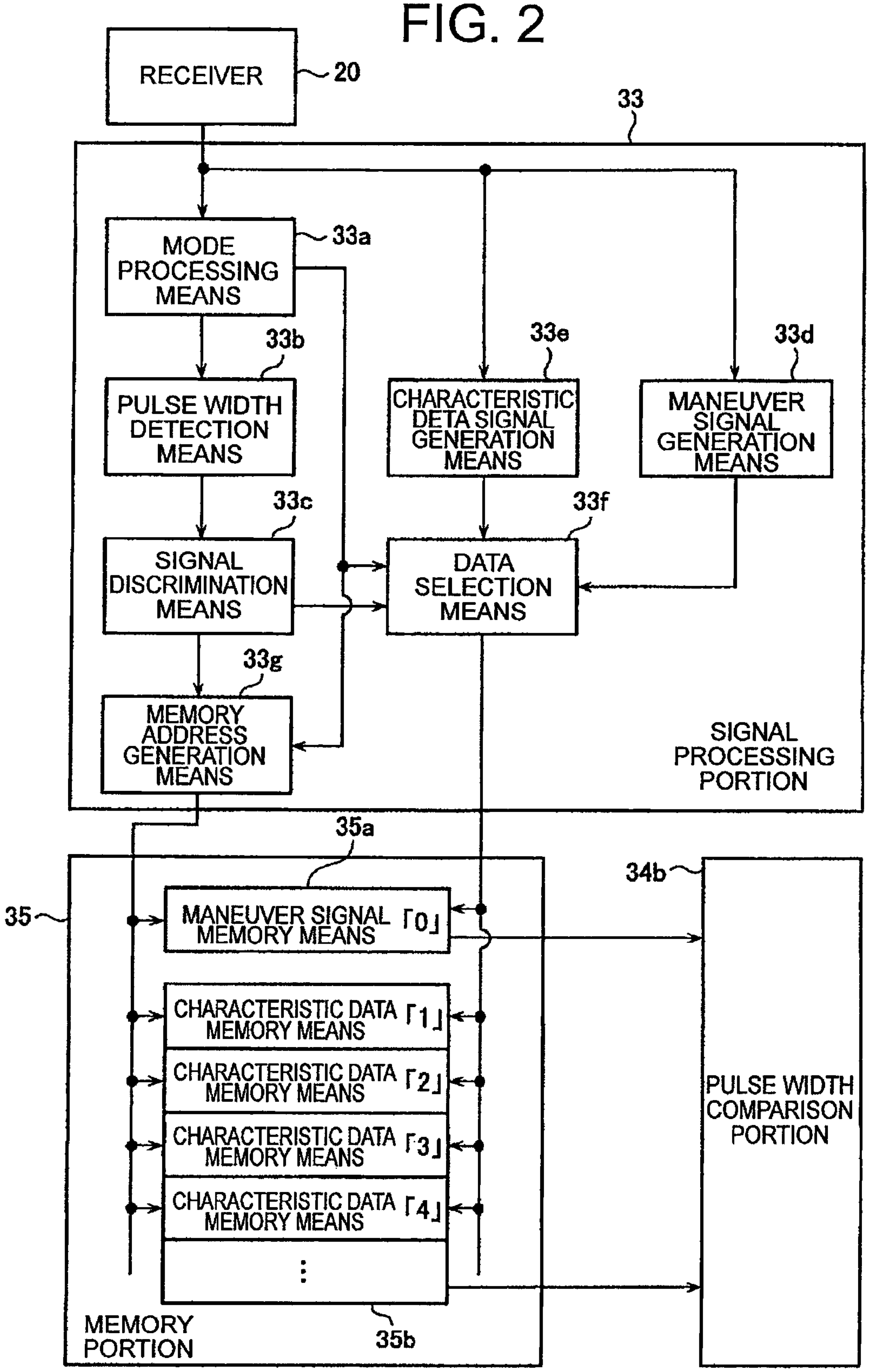
FIG. 2 is a functional block diagram showing a signal processing portion and a memory portion of the above device in detail.

As shown in FIG. 1, a remote control device 1 of this embodiment includes: a transmitter 10 for transmitting various control signals (maneuver signal or characteristic data signal) to an operational object as a remote control target (for example, various models or an industrial machine such as a helicopter, an airplane, a vehicle, a ship, and a robot); and a servo device 30 mounted on the operational object and controlling a movement amount of a movable region based on the control signal received via a receiver 20.

Incidentally, the receiver 20 may be connected to a plurality of servo devices 30. Further, the receiver 20 may be optionally connected to a gyroscopic device, a motor controller or the like other than the servo device 30.

(Transmitter)

The transmitter 10 generates and transmits the control signal for operating the servo device 30 mounted on the operational object, and includes: an operating portion 11; a setting portion 12; a signal generating portion 13; and a transmitting portion 14.

The operating portion 11 is composed of various levers such as a stick lever and switches, and outputs an analog signal corresponding to an operation amount based on up down left right operations of various levers, or a push-down operation of the switches as an operational signal with respect to each channel to the signal generating portion 13.

The setting portion 12 is composed of various operation keys such as a touch panel mounted on a display screen of a display device such as a liquid crystal display, an edit key and the like, and is operated when various settings are changed. Concretely, a characteristic setting screen of the servo device 30 is displayed on the display screen of the display device, and with reference to this screen, when a user operates the operation key or the touch panel, the response characteristic with respect to the operation amount upon operating is set. Then, a digital signal based on the setting is outputted as a setting operation signal to the signal generating portion 13.

The signal generating portion 13 is composed of a well-known signal generating circuit for generating the control signal (maneuver signal or characteristic data signal) which is outputted to the servo device 30 via the transmitting portion 14 when the operational signal from the operating portion 11 or the setting operation signal from the setting portion 12 is inputted to the signal generating portion 13. Concretely, the signal generating portion 13 A/D-converts the operational signal from the operating portion 11, carries out a signal processing so as to sending the processed operational signal in a specific cycle in a time-division manner (for example, a pulse width of each channel is 1520 μS±600 μS in a cycle of 14 to 20 mS/frame), and outputs the control signal generated by this processing as the maneuver signal (PWM signal) to the transmitting portion 14. Further, the signal generating portion 13 carries out a signal processing so that the setting operation signal from the setting portion 12 becomes a serial data, and outputs the control data generated by this processing as the characteristic data signal to the transmitting portion 14.

The transmitting portion 14 modulates the control signal (maneuver signal or characteristic data signal) from the signal generating portion 13 by high-frequency modulation (for example, AM modulation or FM modulation) or by spread spectrum modulation, and then transmits as a radio wave from an antenna via the receiver 20 to the servo device 30.

(Receiver)

The receiver 20 is a well-known receiver configured to amplifies a received radio wave from the transmitter 10 received as the radio wave from the antenna, and to demodulate to the control signal and output to the servo device 30.

(Servo Device)

The servo device 30 respectively and independently drives and controls the movable regions of the operational object (for example, if the operational object is a model airplane, the movable regions correspond to a rudder, an elevator, an engine throttle, an aileron and the like) based on the control signal received via the receiver 20, and includes: a control portion 31; and a drive mechanism 32.

(Control Portion)

The control portion 31 is a control LSI (Large Scale Integration) for driving and controlling the drive mechanism 32 based on the maneuver signal from the transmitter 10, and includes: a signal processing portion 33; a motor control portion 34; and a memory portion 35.

The signal processing portion 33 includes: a mode processing means 33*a*; a pulse width detection means 33*b*; a signal discrimination means 33*c*; a maneuver signal generation means 33*d*; a characteristic data signal generation means 33*e*; a data selection means 33*f*; and a memory address generation means 33*g*. The signal processing portion 33 generates the maneuver signal or the characteristic data signal from the control signal, and stores the signal in the memory portion 35 based on the discrimination result of the input elapsed time of the control signal received by the receiver 20, and the discrimination result of the pulse width of the signal.

The mode processing means 33*a* switches the maneuver mode for normal maneuvering and the signal discrimination mode for discriminating the type of the signal based on the elapsed time from the previously received control signal by the receiver 20 to the next inputted control signal, and outputs the mode data (maneuver mode data or signal discrimination mode data) corresponding to the switched mode condition to the pulse width detection means 33*b* and the data selection means 33*f*.

The pulse width detection means 33*b* detects the pulse width of the control signal inputted via the receiver 20 based on the signal discrimination mode data from the mode processing means 33*a*, and outputs the detection result as the pulse width data to the signal discrimination means 33*c*.

The signal discrimination means 33*c* identifies the type of the control signal based on the pulse width data from the pulse width detection means 33*b*, and previously set signal discrimination data (for example, a threshold value to compare the pulse width for discriminating whether the pulse width of the inputted control signal is less than a specific length or not), and outputs the discrimination result as the signal discrimination data to the data selection means 33*f* and the memory address generation means 33*g*.

The maneuver signal generation means 33*d* generates the maneuver signal from the control signal assuming that the inputted control signal is the maneuver signal, and temporarily holds the maneuver signal. Incidentally, the maneuver signal generation means 33*d* is reset based on a reset signal from the data selection means 33*f*.

The characteristic data signal generation means 33*e* generates the characteristic data signal from the control signal assuming that the inputted control signal is the characteristic data signal, and temporarily holds the characteristic data signal. Incidentally, the characteristic data signal generation means 33*e* is reset based on a reset signal from the data selection means 33*f*.

The data selection means 33*f* selects and extracts the generated maneuver signal or characteristic data signal from the maneuver signal generation means 33*d* or the characteristic data signal generation means 33*e* based on the signal discrimination data from the signal discrimination means 33*c*, and stores the signal in the memory portion 35. Further, when the maneuver mode data is inputted from the mode processing means 33*a*, the data selection means 33*f* selects and extracts the maneuver signal from the maneuver signal generation means 33*d*, and stores the maneuver signal in the memory portion 35. Incidentally, when extracting any one of the maneuver signal or the characteristic data signal, the data selection means 33*f* outputs the reset signal for resetting the currently held signal to the maneuver signal generation means 33*d* and the characteristic data signal generation means 33*e*.

The memory address generation means 33*g* assign an address of a memory area for storing the generated maneuver signal or characteristic data signal based on the signal discrimination data from the signal discrimination means 33*c* (namely, assigning the address of each memory area in the memory portion 35 corresponding to the characteristic data in the maneuver signal memory means 35*a* or the characteristic data memory means 35*b*), and outputs the assigned memory address to the memory portion 35.

The motor control portion 34 includes: a position signal generation portion 34*a* for generating and outputting a position signal as the pulse signal corresponding to the position data from the position detection portion 34*e* (data indicating a rotational position of the output shaft 32*c* of the drive mechanism 32); a pulse width comparison portion 34*b* for comparing a pulse width of the position signal with a pulse width of the maneuver signal stored in the memory portion 35 and for generating and outputting a differential pulse signal as the difference; a PWM generation circuit 34*c* for generating and outputting a drive signal corresponding to the characteristic data stored in the memory portion 35 from the differential pulse signal as a comparison output; and a drive circuit 34*d* for driving and controlling a rotational direction of the drive mechanism 32 by flowing a current in a normal direction or a reverse direction corresponding to the drive signal.

Figure 3:
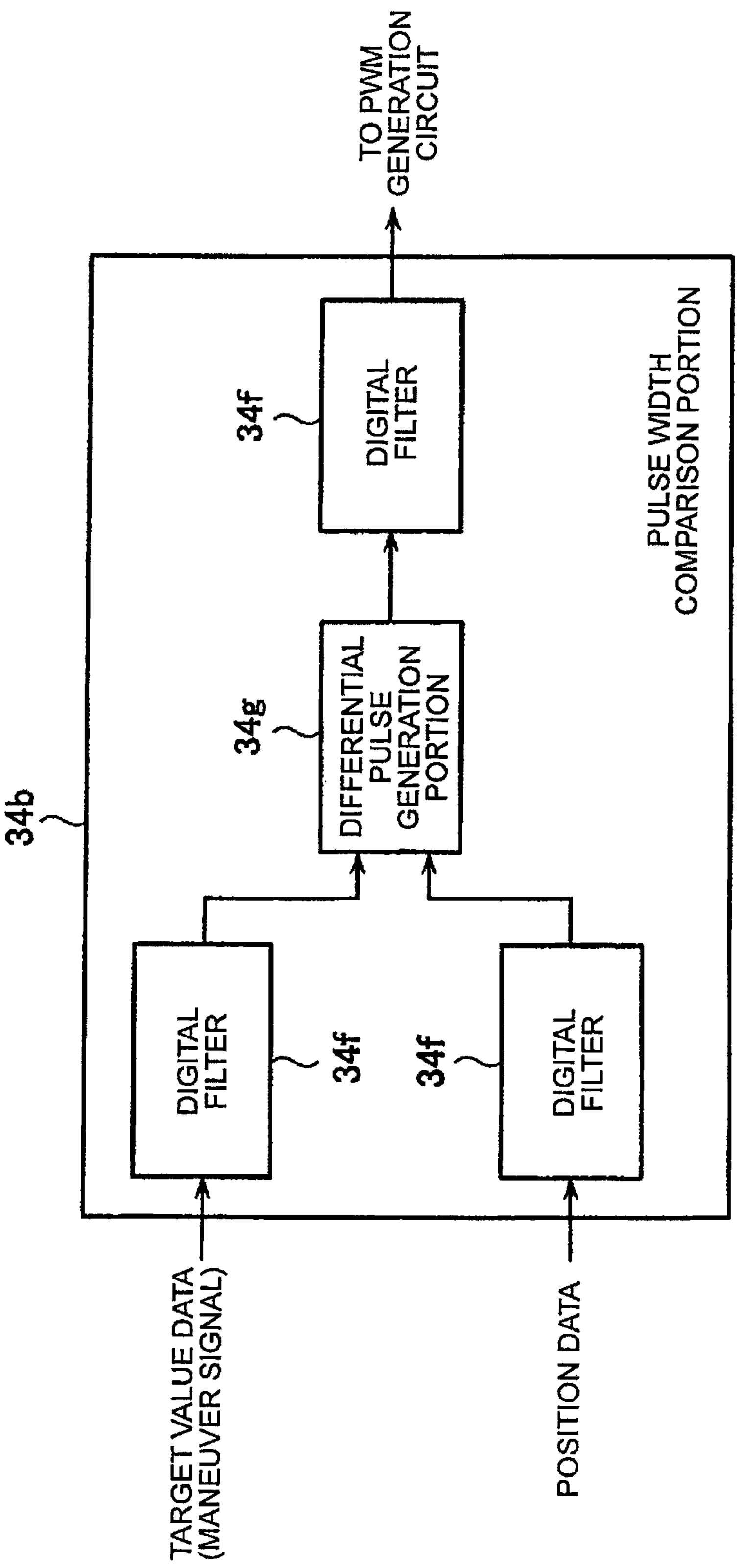
FIG. 3 is a functional block diagram showing a pulse width comparison portion of the above device in detail.

As shown in FIG. 3, the comparison processing of the pulse width comparison portion 34*b* is to allow the maneuver signal from the transmitter 10 as the target value data and the position data from the position detection portion 34*e* to pass the digital filter 34*f*, and to generate the differential pulse signal by adding the target value data and the position data in the differential pulse generation portion 34*g*. This digital filter 34*f* works as a filter for correcting the maneuver signal, the position data and the differential pulse signal corresponding to the characteristic data so as to drive smoothly, because when reflecting the maneuver signal from the transmitter 10 directly, a motor may be driven rapidly. Further, the drive mechanism 32 may include a speed detecting means for detecting speed data of the motor 32*a*, and the differential pulse signal may be generated using the speed data in addition to the maneuver signal and the position data.

Incidentally, in this embodiment, a custom IC in which the motor control portion 34 is integrated in one chip LSI is used. Of course, each part of the motor control portion 34 may be composed of an individual circuit separated from each other.

The memory portion 35 is composed of a rewritable nonvolatile memory such as EEPROM, and includes: a maneuver signal memory means 35*a* for storing the maneuver signal; and a characteristic data memory means 35*b* for storing the characteristic data signal as the characteristic data. The memory portion 35 updates and stores respectively the maneuver signal or the characteristic data signal from the data selection means 33*f*.

The maneuver signal memory means 35*a* is a memory area for storing the maneuver signal from the data selection means 33*f*, and a memory address (for example, address "0") is previously set for storing the maneuver signal.

In the characteristic data memory means 35*b*, the memory area is divided based on the number of the characteristic data for individually storing a plurality of characteristic data. Further, the memory address (for example, address "1" to "4" in FIG. 2) corresponding to each characteristic data is previously set in every memory area. Therefore, the characteristic data signal from the data selection means 33*f* is stored in the memory area corresponding to the memory address generated by the memory address generation means 33*g*.

Incidentally, as a type of the characteristic data, there are, for example, servo reverse (change of a rotational direction of the servo), neutral adjustment (change of a neutral position as a reference position of the output shaft), speed control (setting of moving speed), dead band (angle designation of the dead zone), rudder adjustment (left and right maximum rudder angle adjustment centered on the neutral position), boost (setting the minimum current upon servo drive), damper (setting about the regulation of hunting), stretcher (designation of proportional constant between a torque for returning to the target position and accidental error), and the like.

(Drive Mechanism)

In the drive mechanism 32, the motor 32*a* is driven by the current amount based on the drive signal supplied from the drive circuit 34*d*, and the movable region is moved by a rotation of the output shaft 32*c* connected via the deceleration mechanism 32*b*. Further, the rotational position of the output shaft 32*c* is detected by the position detection portion 34*e* (for example, potentiometer, rotary encoder, resolver, or the like, as long as it can detect the position (rotational angle) of the output shaft 32*c*), and the position data is outputted to the position signal generation portion 34*a*.

(Handling Operation)

Next, a series of handling operations of the servo device 30 in the remote control device 1 will be explained with reference to FIG. 4.

Figure 4:
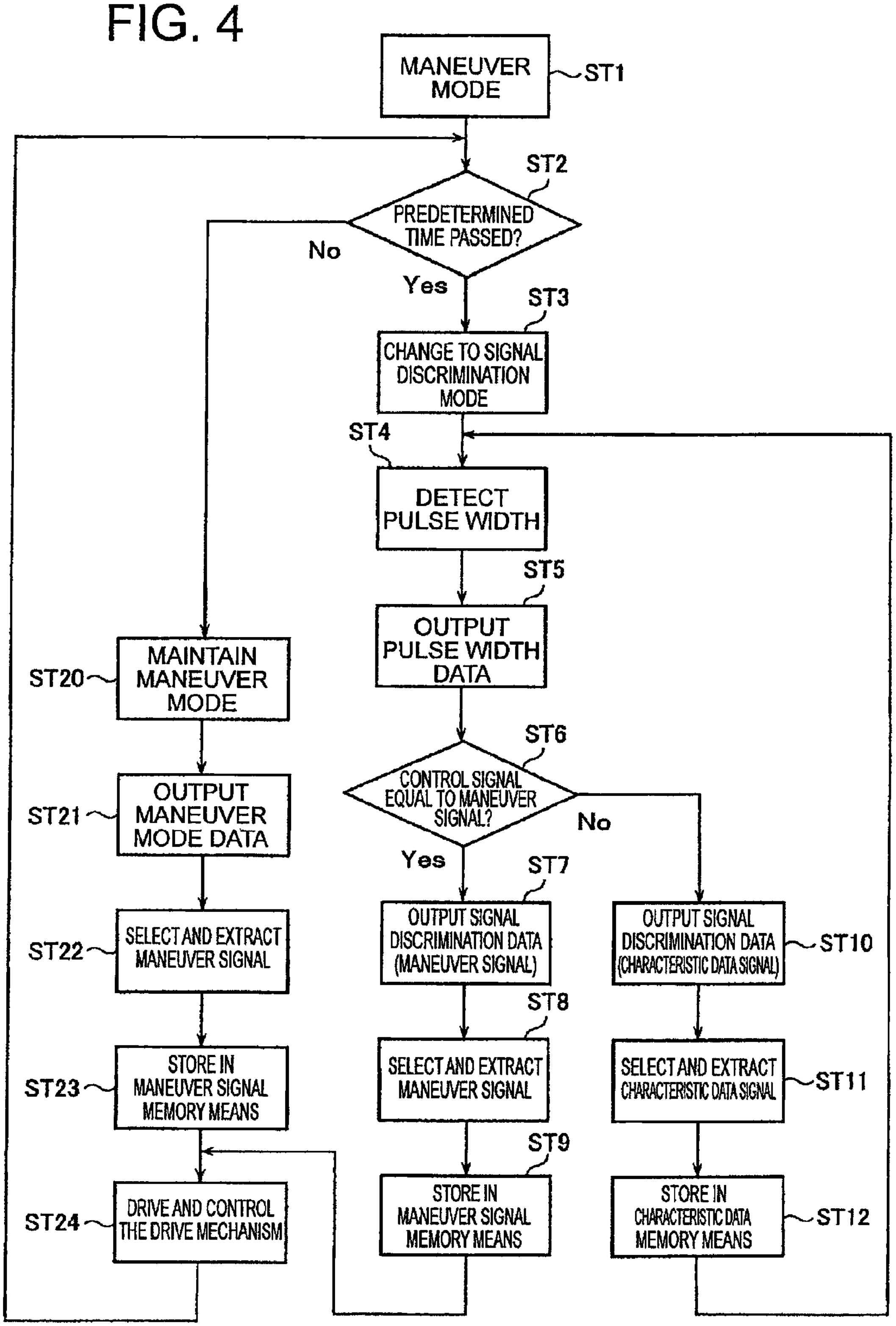
FIG. 4 is a flowchart showing a series of processing operations in the above device.

As shown in FIG. 4, firstly, after the power is on, the servo device 30 is in a condition (maneuver mode) for receiving the control signal as the maneuver signal from the transmitter 10 via the receiver 20 (ST1). Then, the mode processing means 33*a* judges whether the predetermined time has passed or not from the last receiving timing of the received control signal from the transmitter 10 (ST2).

Incidentally, as is not shown, in parallel with the processing of ST2, the maneuver signal generation means 33*d* supposes that the inputted control signal is the maneuver signal, generates and temporarily holds the maneuver signal from the control signal, and the characteristic data signal generation means 33*e* supposes that the inputted control signal is the characteristic data signal, generates and temporarily holds the characteristic data signal from the control signal.

In ST2, when judging that the predetermined time has passed from the last receiving timing of the control signal (ST2-Yes), the maneuver mode is changed to the signal discrimination mode (ST3), and the pulse width detection means 33*b* detects the pulse width of the control signal inputted via the receiver 20 based on the signal discrimination mode data from the mode processing means 33*a* (ST4). Next, the detection result as the pulse width data is outputted to the signal discrimination means 33*c* (ST5), and the signal discrimination means 33*c* identifies the type of the inputted control signal based on the pulse width data from the pulse width detection means 33*b* and the previously set signal discrimination data (ST6).

In ST6, when the inputted control signal is the maneuver signal (ST6-Yes), the signal discrimination data indicating that the control signal is the maneuver signal as the discrimination result is outputted to the data selection means 33*f* and the memory address generation means 33*g* (ST7). Then, the data selection means 33*f* selects and extracts the maneuver signal generated by the maneuver signal generation means 33*d* based on the signal discrimination data from the signal discrimination means 33*c* (ST8), and stores the maneuver signal in the maneuver signal memory means 35*a* according to the memory address corresponding to the maneuver signal generated by the memory address generation means 33*g* (ST9).

Incidentally, because the processing in ST9 is similar to the later-described processing in ST23, after the memory processing of the maneuver signal, the process goes to ST24, and the drive mechanism 32 is driven and controlled based on the maneuver signal.

When the inputted control signal is not the maneuver signal (ST6—No), the signal discrimination data indicating that the control signal is the characteristic data signal as the discrimination result is outputted to the data selection means 33*f* and the memory address generation means 33*g* (ST10), and the data selection means 33*f* selects and extracts the characteristic data signal generated by the characteristic data signal generation means 33*e* based on the signal discrimination data from the signal discrimination means 33*c* (ST11). Then, the characteristic data signal is stored in the memory area in the characteristic data memory means 35*b* according to the memory address corresponding to the characteristic data signal generated by the memory address generation means 33*g* (ST12), and the process goes back to ST4.

In ST2, when judging that the predetermined time has not passed from the last receiving timing of the control signal (ST2—No), the maneuver mode is maintained (ST20), and the maneuver mode data indicating the current mode is outputted to the data selection means 33*f* and the memory address generation means 33*g* (ST21). Next, the data selection means 33*f* selects and extracts the maneuver signal from the maneuver signal generation means 33*d* based on the inputted maneuver mode data (ST22), and stores the maneuver signal in the maneuver signal memory means 35*a* according to the memory address corresponding to the maneuver signal generated by the memory address generation means 33*g* (ST23). Then, the motor control portion 34 generates the differential pulse signal from the maneuver signal stored in the maneuver signal memory means 35*a* and the position data of the output shaft 32*c* of the motor 32*a*, and drives and controls the drive mechanism 32 with the drive signal corresponding to the characteristic data (ST24), and the process goes back to ST2.

As explained above, the above-described servo device 30 receives the control signal from the transmitter 10 via the receiver 20, and when the control signal is not received in the predetermined time, changes the maneuver mode to the signal discrimination mode. Then, the servo device 30 compares the next received control signal with the signal discrimination data to discriminate the type of the signal, and when discriminating that the received signal is the characteristic data signal, outputs this signal to the memory portion 35 to update the characteristic data.

Because of this, by only outputting the control signal generated by the transmitter 10 to the servo device 30 via the receiver 20, the setting of the characteristic data as the response characteristic is easily carried out in addition to the normal operation of the operational object without using the unused channel of the transmitter 10 and without using the external device such as PC. Therefore, usability is improved.

Incidentally, in the above embodiment, the setting portion 12 for setting the servo device 30 and the operating portion 11 for operating the servo device 30 are independently provided. However, the operating portion 11 may be used as the setting and operating means of the setting portion 12, for example, when setting the characteristic, while seeing the display screen of the setting portion 12, the setting is changed by the operation of the operating portion 11.

Further, in the above embodiment, as the characteristic data signal transmitted from the transmitter 10, one serial data is transmitted in each device of the servo device 30. However, the characteristic data signal may be transmitted as one serial data corresponding to a plurality of devices. Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A servo device comprising:
a drive mechanism;
a memory; and
a control portion including a signal processing portion, the control portion in communication with the drive mechanism, and the memory, wherein the control portion is programmed to receive a control signal from a transmitter,
to use the signal processing portion for discriminating whether the control signal from the transmitter is a maneuver signal for driving and controlling the drive mechanism or a characteristic data signal for changing response characteristic of the characteristic data,
to transform the control signal into a drive signal corresponding to characteristic data previously stored in a memory portion when the signal processing portion determines that the control signal is a maneuver signal, and
to update the memory portion to store the received characteristic data signal when the signal processing portion determines that the control signal is a characteristic data signal.

2. The servo device as claimed in claim 1,
wherein the characteristic data signal is serial data including data defining a response characteristic, and the maneuver signal is a PWM signal.

3. The servo device as claimed in claim 1,
wherein the signal processing portion holds a threshold value for comparing to a pulse width signal from the transmitter to discriminate whether the control signal is a maneuver signal or a characteristic data signal.

4. The servo device as claimed in claim 3,
wherein the memory portion includes: a maneuver signal memory portion for storing the maneuver signal; and a characteristic data memory portion including memory areas for individually storing corresponding characteristic data, and a memory address corresponding to each memory area,
wherein the signal processing portion is further programmed to generate a memory address to store the maneuver signal in the maneuver signal memory portion, and a memory address to store the characteristic data in the corresponding memory area of the characteristic data memory portion, and
wherein the signal processing portion is further programmed to compare the pulse width of the control signal with the threshold value, and if the control signal is a maneuver signal, to store the maneuver signal in the maneuver signal memory portion corresponding to the memory address generated by the signal processing portion, and if the control signal is a characteristic data signal, to store the characteristic data signal in the corresponding memory area of the characteristic data memory portion means at the corresponding memory address.

5. The servo device of claim 1, wherein the characteristic data signal represents at least one of a servo reverse, a neutral adjustment change, a speed control, a dead band adjustment, a rudder adjustment, a boost, a damper, and a stretcher control signal.

6. A remote control device comprising:
a transmitter for transmitting a control signal which is one of a maneuver signal and a characteristic data signal, wherein the maneuver signal includes an operational command for each of a plurality of channels corresponding to movable region of an operational object, and the characteristic data signal comprises data for changing response characteristics;
a receiver for receiving the control signal from the transmitter; and
a servo device for discriminating whether the control signal received via the receiver is a maneuver signal or a characteristic data signal and for updating and storing the characteristic data stored in a memory portion based on the received characteristic data signal when the control signal is a characteristic data signal.

7. The remote control device of claim 6, wherein the characteristic data signal represents at least one of a servo reverse, a neutral adjustment change, a speed control, a dead band adjustment, a rudder adjustment, a boost, a damper, and a stretcher control signal.

* * * * *